E. A. RUSSELL AND S. P. HARRIMAN.
HOSE COUPLING.
APPLICATION FILED JAN. 24, 1916.
1,346,421.
Patented July 13, 1920.
8 SHEETS—SHEET 3.
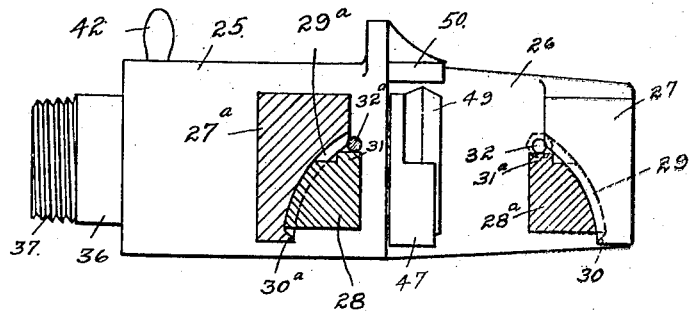
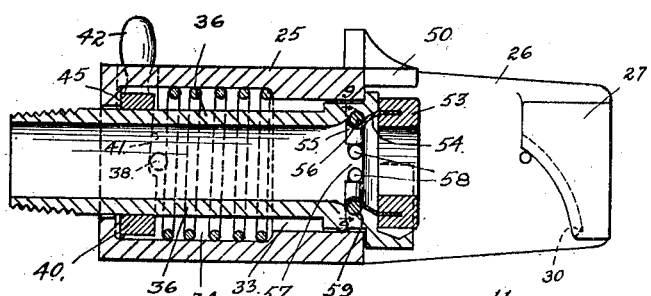
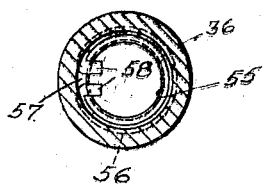
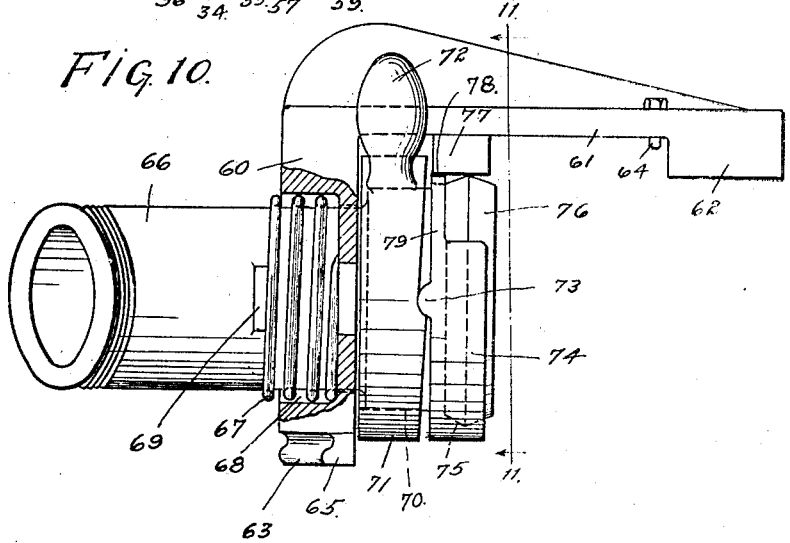
INVENTORS
Edward A. Russell
Selby P. Harriman
BY Barnett Truman
ATTORNEYS E. A. RUSSELL AND S. P. HARRIMAN.
HOSE COUPLING.
APPLICATION FILED JAN. 24, 1916.

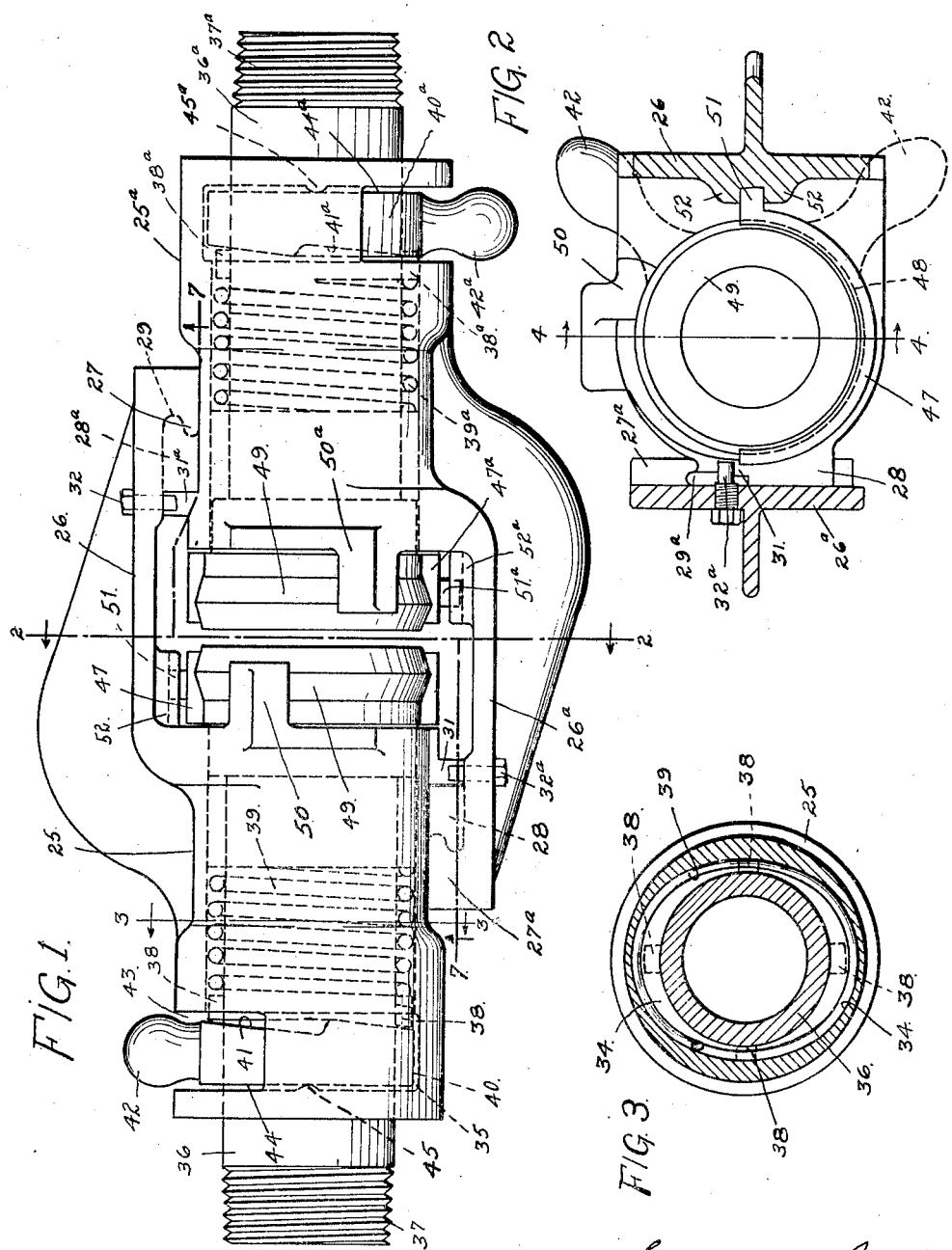

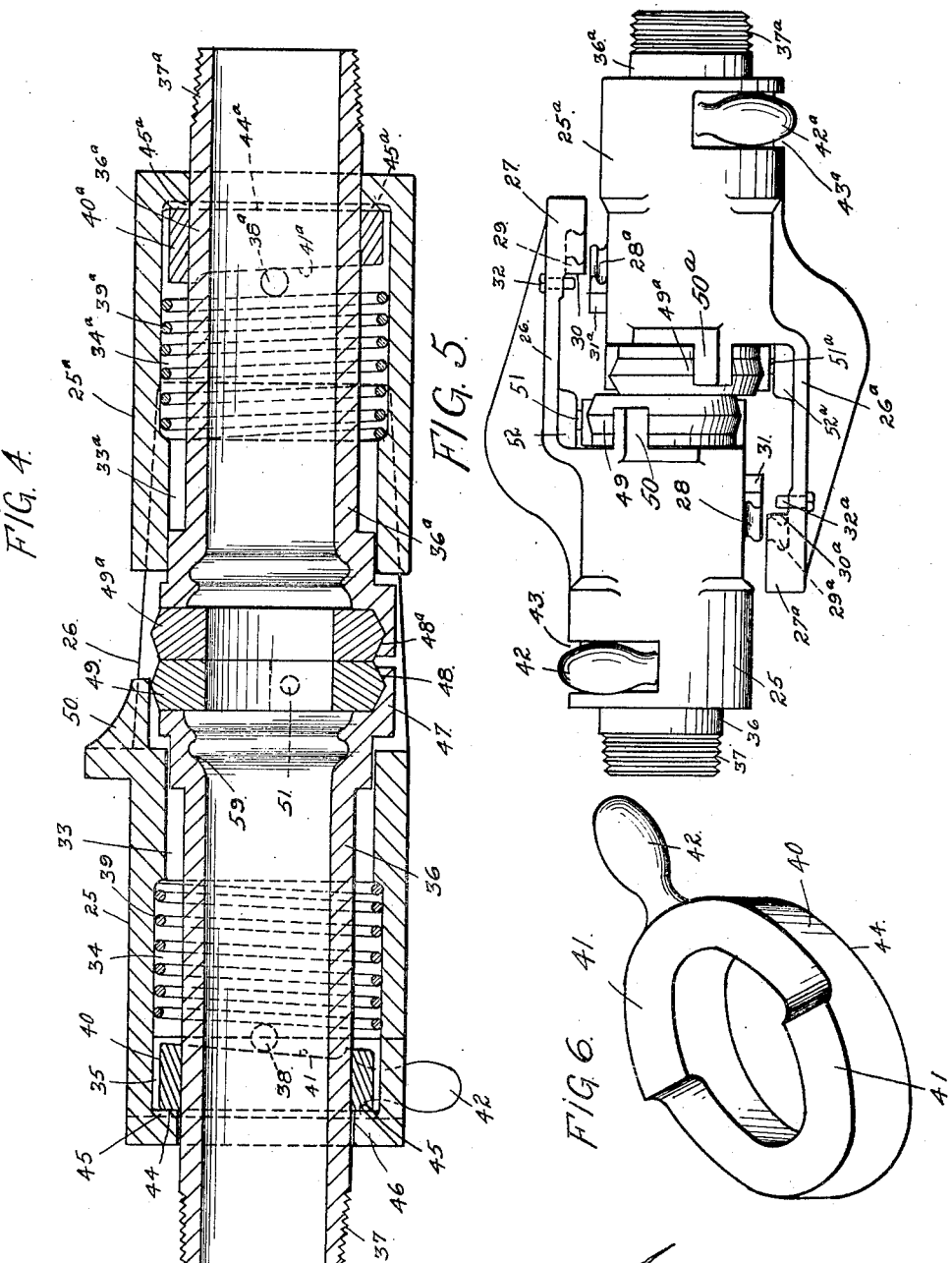

1,346,421.

Patented July 13, 1920.
8 SHEETS—SHEET 4.

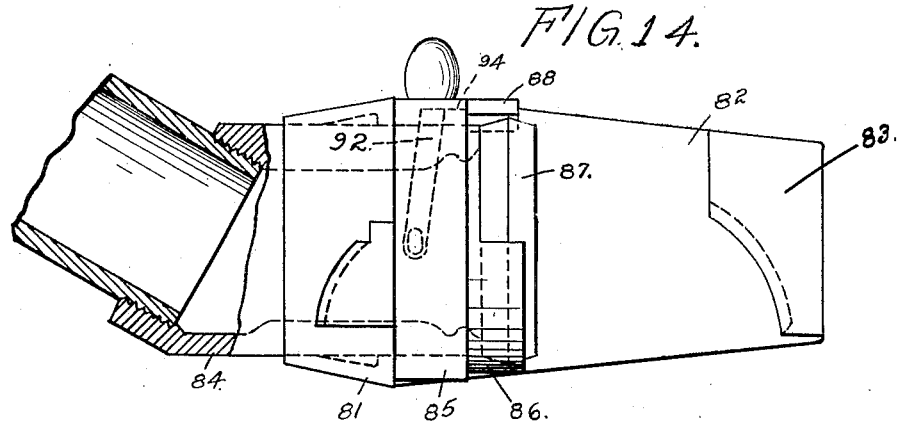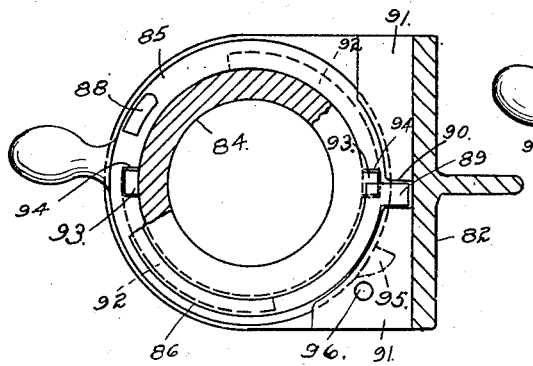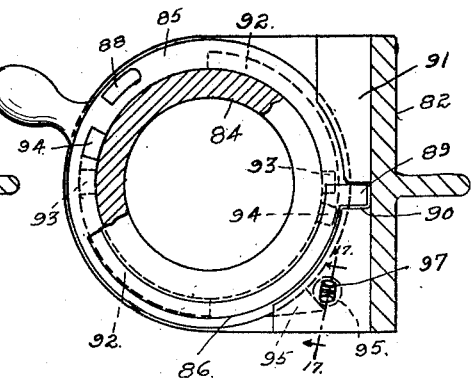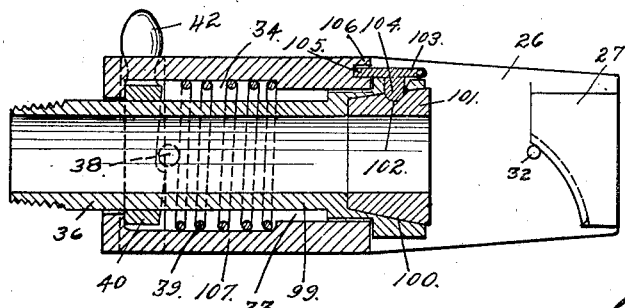

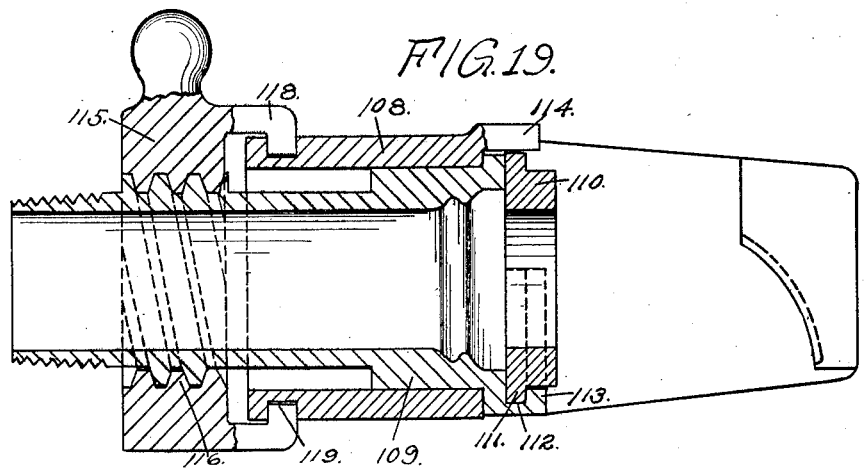
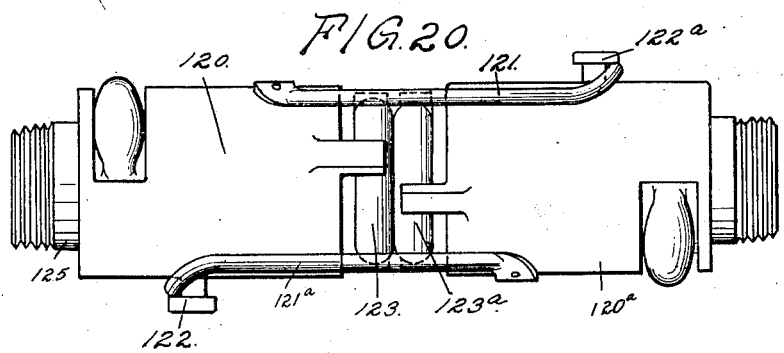
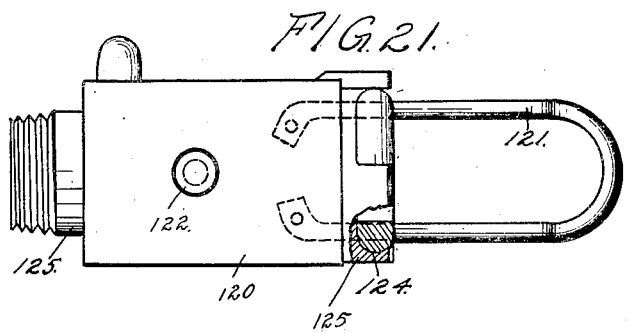

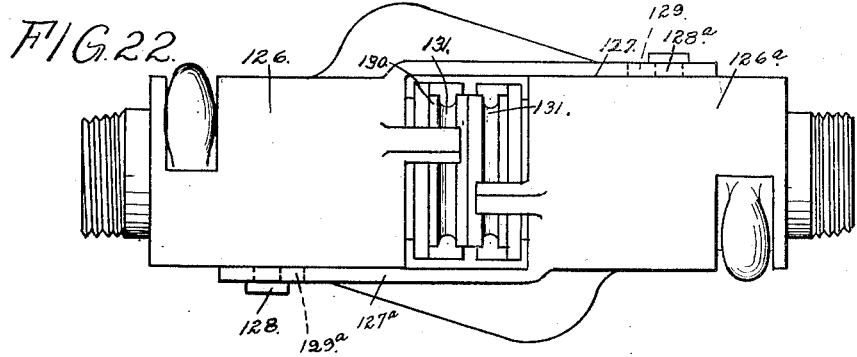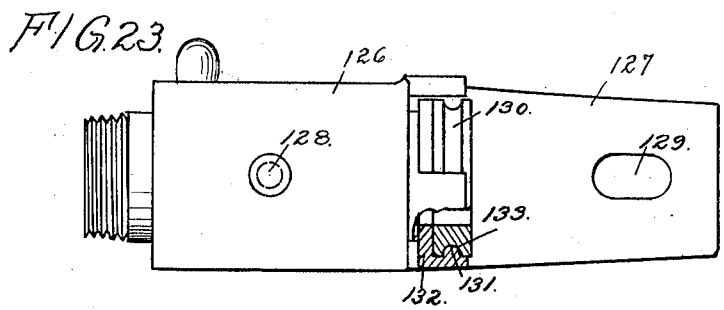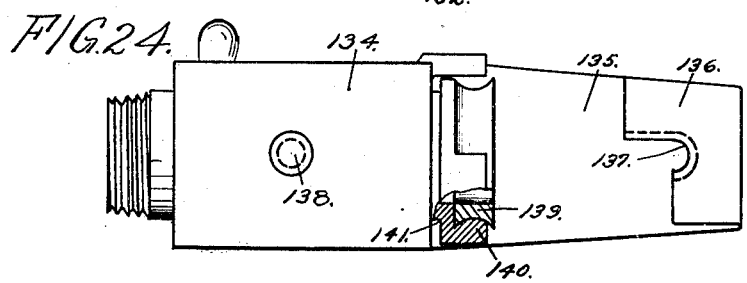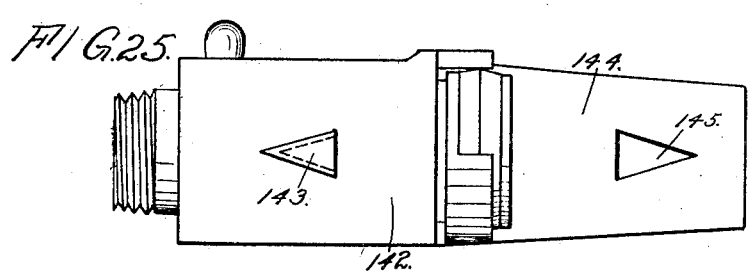

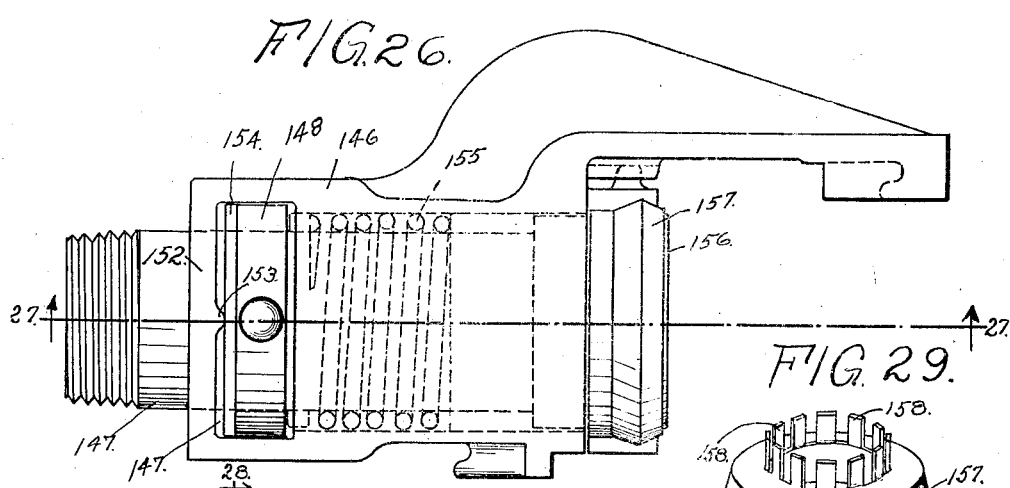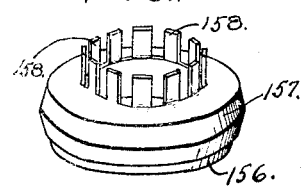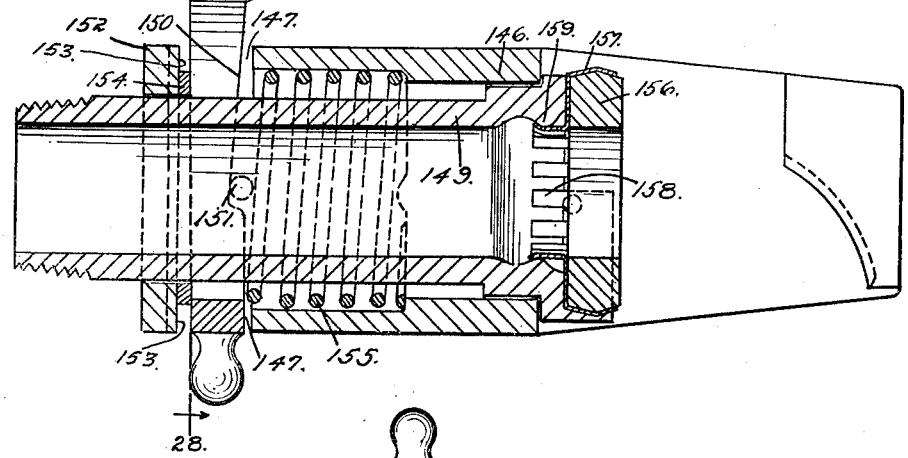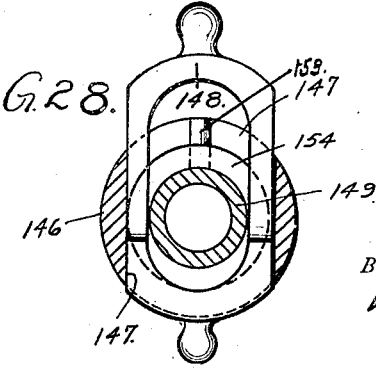

UNITED STATES PATENT OFFICE.

EDWARD A. RUSSELL AND SEELYE P. HARRIMAN, OF CHICAGO, ILLINOIS, ASSIGNORS, BY MESNE ASSIGNMENTS, TO ROTH MANUFACTURING COMPANY, OF CHICAGO, ILLINOIS, A CORPORATION OF ILLINOIS.

HOSE-COUPLING.

1,346,421.   Specification of Letters Patent.   Patented July 13, 1920.

Application filed January 24, 1916. Serial No. 73,885.

*To all whom it may concern:*

Be it known that we, EDWARD A. RUSSELL and SEELYE P. HARRIMAN, citizens of the United States, residing at Chicago, in the county of Cook and State of Illinois, have invented certain new and useful Improvements in Hose-Couplings, of which the following is a specification.

Our invention relates to train pipe hose couplings. One of the objects of the invention is to provide a coupling of novel and improved construction in which the operations of engaging and disengaging the coupler heads, or mating members of the coupling, may be accomplished without the rocking movement incident to the coupling and uncoupling of devices of the usual "gravity" type. This rocking movement, by necessitating a bending or cramping of the hoses, tends to shorten the life of the hoses considerably. The invention has for one of its purposes to provide a coupling in which the coupler heads may be placed side by side and brought into coupled relation without any rocking movement. Our invention, however, in its preferred embodiment, contemplates a coupler head so constructed that it may be mated in the usual way with any standard coupler head of the gravity type, that is to say, either in a manner just described or by a rocking movement in case the construction of the mating member should require it.

A further object is to provide a novel arrangement of the parts of a coupling whereby the joint between the gaskets is made more surely tight. In the case of the couplings of steam train pipes there has been considerable difficulty experienced in maintaining a steam-tight joint between the gaskets. The gaskets, for one thing, tend to shrink or be compressed so that after a certain period of service they do not come as close together as at first. To remedy this it has been customary, in some cases, to use a long gasket and depend upon the expansibility of the rubber composition under the temperature of steam to close the crack between the gasket faces. This involves considerable expense, as this sort of material is costly, and is not altogether successful because in time the gaskets lose their capacity for expansion.

Our invention contemplates an arrangement by which the gaskets of a coupler may be moved toward each other, after the coupler heads have been engaged. This movement is preferably in the direction of the axis of the gaskets so that the meeting faces are brought together at all points at once. This prevents the fraying or crushing of the gaskets at one point which frequently results when the gaskets are brought together by a rocking movement.

A further object of the invention is to so construct the coupler heads that they will be positively locked one to the other when the gasket holders are moved to bring the gaskets into contact. In other words, the locking of the heads is not accomplished by supplemental means, in the preferred form of our invention, but by the movement of the parts necessary for completing the coupling operation.

A further object of the invention is to provide a form of coupling using a relatively short gasket. Preferably the construction is such that the gasket may be reversed so that when one face is worn the gasket may be turned around with the opposite face presented to the gasket of the other member of the coupling.

The invention consists in certain novel and improved constructions, arrangements and devices to be hereinafter described and claimed for carrying out the above stated objects and such other objects as will appear from the following specification.

The invention is illustrated, in certain alternative embodiments, in the accompanying drawings wherein—

Figure 1 is a plan view of a coupling showing one of these typical and preferred embodiments.

Figs. 2 and 3 are sectional views taken on lines 2—2 and 3—3, respectively, of Fig. 1.

Fig. 4 is a longitudinal sectional view of the coupling taken on line 4—4 of Fig. 2.

Fig. 5 is a plan view, on a smaller scale, of the two coupler heads showing them in the position which they assume just before they are brought into coupled relationship.

Fig. 6 is a view, in perspective, of the revoluble cam for shifting the gasket holder of one of the coupler members.

Fig. 7 is a sectional view, on a smaller scale, taken on the broken line indicated by numerals 7—7 on Fig. 1.

Fig. 8 is a longitudinal sectional view of a coupling member such as is shown in the preceding figures, but provided with a certain form of gasket in common use at the present tme.

Fig. 9 is a fragmentary sectional view taken on line 9—9 of Fig. 8.

Fig. 10 is a plan view, with certain parts broken away, of a modified form of coupler embodying the principles of our invention.

Fig. 14 is a side elevation of the same with certain parts in section.

Fig. 15 is a fragmentary sectional elevation of the coupler member looking toward the gasket end of the device but with the gasket removed and showing the parts in the position which they assume while being assembled.

Fig. 16 is a similar view showing the device completely assembled.

Fig. 17 is a fragmentary sectional view on line 17—17 of Fig. 16.

Fig. 18 is a longitudinal sectional view of a coupler member similar in general construction to that shown in the first seven figures but modified with respect to the gasket and the means employed for holding said gasket in place in the gasket holder.

Fig. 19 is a longitudinal sectional view of a modification in which the actuating member is threaded on a gasket holding member.

Fig. 20 is a plan view of another embodiment of the invention.

Fig. 21 is a side elevation, partly in section, of one of the mating elements of the coupling shown in Fig. 20.

Fig. 22 is a plan view of another modified construction.

Fig. 23 is a side elevation, partly in section, of one of the coupler elements of this coupling.

Fig. 24 is a view, similar to Fig. 23, showing a further modification.

Fig. 25 is a similar view of a coupler element of the same general character but modified in respect to the means employed for engaging it with the mating element.

Fig. 26 is a plan view of another embodiment of the invention.

Fig. 27 is a section taken on line 27—27 of Fig. 26.

Fig. 28 is a sectional view on line 28—28 of Fig. 27 but taken on a smaller scale, and Fig. 29 is a view, in perspective, of the gasket shown in Figs. 26 and 27.

Figure 11:
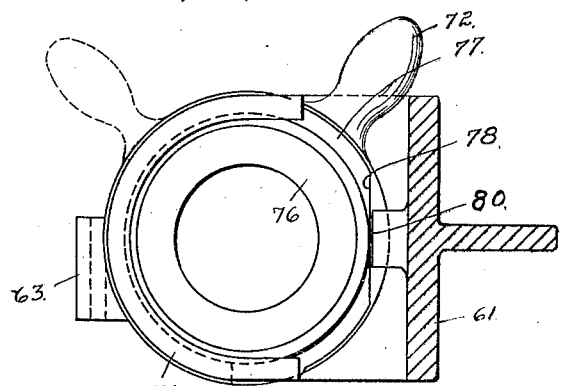
Fig. 11 is a sectional elevation on line 11—11 of Fig. 10.

The embodiment of the invention shown in Figs. 1 to 7 inclusive will first be described. As the two elements of the coupling shown are exactly alike we will describe the left hand element by the use of reference numerals with the understanding that the corresponding parts of the other element are indicated on the drawings by corresponding numerals distinguished by the exponent letter $a$.

25 is a coupler head or coupling member formed preferably with the usual projecting locking arm 26 provided with an undercut cam lug 27. On the other side of the coupler head is an undercut cam lug 28. These lugs, or as they may be called, "gravity cams" engage with the corresponding cam lugs on the mating coupler head $25^a$. Preferably, the coupling members are provided with means whereby they will be held in proper alinement before the gaskets are moved into contact with each other and subsequently as against any tendency there may be, for said members to rock on their cams when force is applied to the gasket-holding or conduit members for the purpose of bringing the gaskets together. With these ends in view, the undercut groove 29 in the arm 26 is closed at the bottom, as indicaed at 30 (Figs. 5 and 7) forming a stop for the interlocking lug $28^a$ of the mating coupler member. This prevents the coupler heads from being rocked when the gaskets are pressed together so as to produce a gap between the gaskets at the top; such tendency being due to the arrangement of the locking lug centers below the axis of the gaskets. The lug 28 is formed on the top with a projection 31 and the arm $26^a$ of the other coupler member is provided with a stud $32^a$ which bears against this projection. This engagement prevents the weight of the coupler heads from producing a gap between the gaskets at the bottom and holds the coupler heads in alinement with each other before the gaskets are in contact. The reason for forming the lug 28 with the projection 31 instead of placing the stud $32^a$ lower is to permit the coupling up of either coupling member with any standard coupler head of the gravity type. In such case the stud clears the locking lug of the mating head.

The coupling member 25 is hollow, being formed with a cylindrical bore 33, an elliptical counter-bore 34, and back of this a recess 35. 36 is a cylindrical gasket holder or conduit member which projects through the head 25 and is preferably threaded at 37 for the usual hose nipple (not shown). The gasket holder is formed with a pair of projecting lugs 38 against which bears a coiled elliptically shaped spring 39 which is seated in the counter-bore 34 in the head. 40 is a circular cam ring formed with cam faces 41 adapted to bear against the studs 38. The cam ring arranged in the recess 35 in the casing is provided with a handle 42 which projects out through an arcuate slot 43 in the head 25. The rear face 44 of the cam ring, which is plane and normal to the axis of the coupling, bears against protuberances 45 on the inside of the end flange 46, these protuberances being arranged in diametrical relationship with studs 38. The forward end of the gasket holder is formed with a semi-circular flange 47 and is formed interiorly with a V-shaped groove 48 to receive the gasket 49, the perimeter of which is correspondingly formed. The gasket is held in place in the gasket holder, for all normal positions of the latter, by an overhanging lug 50 on the head 25. 51 is a stud on the gasket holder which extends between guide ribs 52 on the inner surface of locking arm 26 to prevent rotation of the gasket holder.

Operation (Figs. 1 to 7 inclusive): The two members of the coupling are brought together in the manner shown in Fig. 5, that is, moving them sidewise, without rocking, one toward the other, the gasket holders 36, 36$^a$ being retracted by springs 39, 39$^a$. The fact that the gasket holders are retracted allows the locking arms 26, 26$^a$ of the coupler heads to clear the corresponding locking lugs 28$^a$, 28 and it is for this reason that it is not necessary to rock the heads. In the coupling operation they need not be shifted out of parallelism with each other. As soon as the coupling members are brought together, they may be released and will then interlock in what may be termed a preliminary interlocking engagement, which is brought about by gravity, the cams operating to center the gasket-holding or coupling members and hold them centered against accidental displacement or against disturbance when the gaskets are forced against each other. The coupling members are held against rocking on their cams by the pins 32, 32$^a$, bearing upon projections 31, 31$^a$. After the heads have been thus engaged the gasket holders are pushed forward, each in the direction toward the other, by giving partial rotation to the cam members 40, 40$^a$. The spring pressure exerted by the spring 39 against the studs 38 on the gasket holder keeps the cam ring in constant engagement with the other member of the coupler and resists the tendency of the vibration of the coupler parts to cause a reverse movement of the cam or otherwise permit the gasket holder to be accidentally moved from its adjusted position. The gaskets, it will be seen, move along a line normal to their meeting faces so that the latter come together squarely. There is enough looseness between the gasket holders and the heads and between the gaskets and the gasket holders so that the meeting faces of the gaskets will adjust themselves to each other regardless of possible slight inequalities on the casting forming the coupler heads. The cam member, in each case, bears at diametrically opposite points on the gasket holders so that movement of the gaskets on their axial line is insured. It will be seen that when the coupling members have been preliminarily engaged they will hang in substantially normal position and need not be held by the train man, whose hands are free to operate the cam rings. Any tendency of the cam rings, when pressure is applied, to rock the coupling members on each other so as to prevent a flat bearing of one gasket on the other, impairing the tightness of the joint and injuring the gaskets, is checked by the engagements of the shoulders 30, 30$^a$ with the cams on which they bear and by the engagement of pins 32, 32$^a$ with the projections 31, 31$^a$. The gasket can be removed from its gasket holder, assuming that the coupler head in question is uncoupled from the mating member, by forcing the gasket holder forwardly far enough so that the gasket will clear the lug 50.

With a pair of couplers constructed as shown and described, or with one of these couplers mated with a coupler of any of the types in common use in connection with railway steam train lines, it is possible to open the coupling sufficiently to permit the outflow of water or of steam without completely disengaging the coupler heads. This has certain very important advantages. When a train is brought to the terminal, for example, it is customary, before the steam train line is connected with the locomotive or with the terminal steam supply pipe, to remove water of condensation from the radiating pipes by bleeding the train line at intervals of two or three cars, for example. That is, the couplers at intervals along the train are opened to allow the water to discharge so that the incoming steam will not have to drive water of condensation the whole length of the train line. With the coupling arrangements heretofore used it is necessary to completely disengage the coupler heads which have to be again coupled up before the steam is turned on. When couplers of the type herein described are used it is only necessary to manipulate the conduit members so as to draw the gaskets apart. The coupler heads may be left in engagement with each other. The closing of the coupling is thereby facilitated. Furthermore, it happens not infrequently that train men are scalded, sometimes fatally, by opening a steam train line coupling when the train line is under considerable steam pressure. This danger is wholly obviated by the use of couplers of the type herein shown and described because the disengagement of the coupler heads involves two successive operations; first, the retraction of the conduit members by rotation of their cams, and second, the disengagement of the coupler heads. If there is any considerable pressure of steam in the train line the outflow of steam between the gaskets, when the conduit members are retracted, will give the trainman warning. The amount so escaping will not, however, be sufficient to cause any injury.
The parts of the coupling member constructed as above described are assembled as follows: The spring 39 is first placed in the elliptical counter-bore 34 in the head and the cam member 40 put into its recess in the head through slot 43. The gasket holder is thrust into the head through the outer end of the same when the lugs 38 are turned ninety degrees from the positions which they normally assume. In Fig. 3 the full lines indicate the normal position of the lugs and the dotted lines the positions which they take when the device is being assembled. In the latter position the lugs will pass through the elliptically shaped spring 39. On being given a quarter turn they will project back of the spring between it and the cam member 40. When the gasket holder is given the quarter turn above mentioned it is held out far enough so that the stud 51 will clear the ribs 52 on the locking arm. In this position the gasket may be put in place. When the gasket holder is released the spring 39 forces it back to its normal position in which the stud lies between the ribs 52 and in which the gasket is overlapped by lug 50.

The gasket 49, when formed as shown, is reversible. When one face becomes worn the gasket may be turned around so as to present the other face to the gasket of the mating coupler head.

In Figs. 8 and 9 we show the coupler of our invention as provided with a certain form of gasket different from that shown in the preceding figures and which is used to a considerable extent at the present time. The gasket 53 has imbedded in it a metal ring 54 formed with a circumferential channel 55 to receive a circular wire 56, the ends of which are bent over as shown at 58 and project inwardly through an opening 57 in the ring. The wire fits into a groove 59 in the gasket holder 36 (see also Fig. 4). By squeezing the ends of the wire 58 together the ring 54 may be contracted sufficiently to remove the gasket from the gasket holder.

Figure 12:
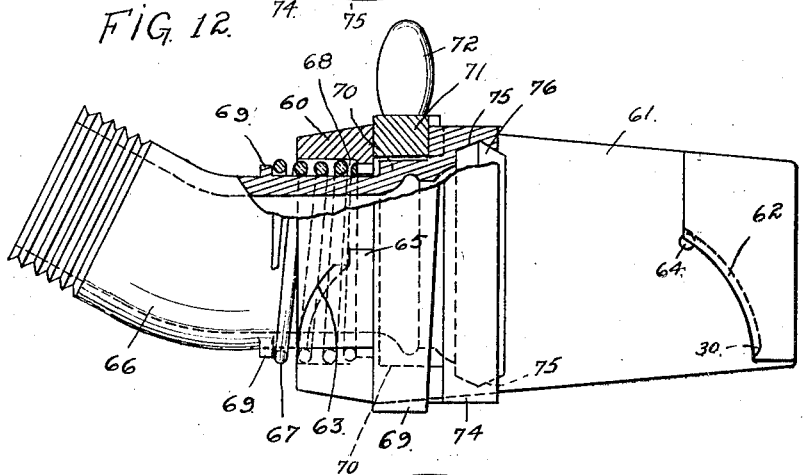
Fig. 12 is a side elevation, with certain parts broken away, of the coupler member shown in the preceding two figures.
Figure 13:
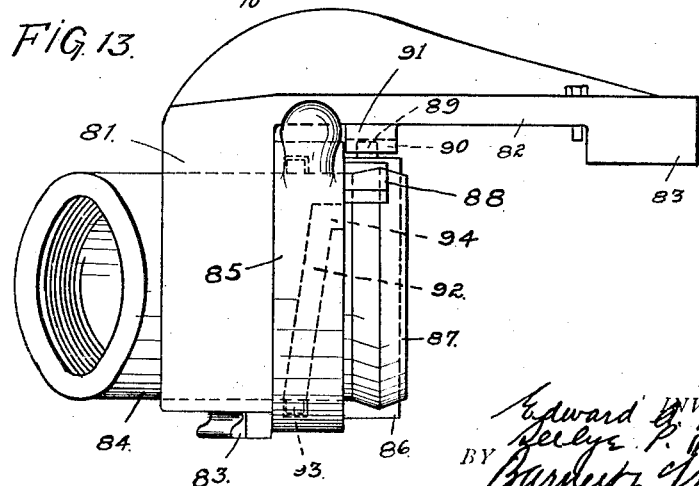
Fig. 13 is a plan view of another coupler member embodying a further modification.

In Figs. 10 to 12 inclusive, we have shown a modified form of the invention, the purpose of the modification being to simplify and lighten the device. The coupler head consists of a ring-like member 60 formed with an arm 61 provided with an undercut locking lug 62, the head being formed on the other side with a locking lug 63. These lugs interlock with corresponding lugs on the mating coupler head in the same manner as the lugs 27, 28 of the form of the invention shown in the first eight figures. Preferably the arm 61 is provided with a stop stud 64 bearing upon a projection 65 on the lug 63, the arrangement being similar to that described in connection with the other form of coupler. The gasket holder 66 projects through the opening in the head 60 and is held in its retracted position by a helical spring 67 arranged in a counter-bore 68 in the head and bearing against ribs 69 formed on the gasket holder. The gasket holder is formed with an enlarged portion 70 outwardly of the head 60 on which turns the annular cam member 71 provided with a handle 72. The cam member works against projections 73 on the gasket holding flange 74 of the gasket holder, the latter being open on the side instead of being open at the top as in the form of the invention previously described. The gasket holding flange 74 is formed with a groove 75, as in the other device, for holding the gasket 76. With the gasket holder in any of its normal positions the gasket is kept in place by a lug 77 on the arm 61. The gasket holder is kept from rotation by the engagement between a flat surface 78 formed on a web 79, which is a continuation of the gasket holding flange 74 but is narrower, with the flat face 80 of the lug 77. The parts are assembled by thrusting the gasket holder through the cam member and then through the opening in the head 60 and turning the spring 67 into place over the lugs 69.

Figs. 13 to 17 inclusive show another modification, the purpose of which is to eliminate the spring used in the devices previously described. Instead a box cam arrangement is employed by means of which the cam moves the gasket holder in each direction. The coupler head 81 is of the same general type as that shown in the preceding three figures, being provided with a locking arm 82 and a locking lug 83 which preferably interlock with the corresponding elements of the mating coupler head precisely as described in connection with the forms of the invention previously described. The gasket holder 84 projects through the coupler head and through the cam ring 85 and is formed with a gasket receiving flange 86 which is open at the top, 87 representing the gasket. The latter is held in place by a lug 88 on the cam ring 85. The gasket holder has a stud 89 which enters a slot 90 in a web 91 formed on the arm 82. The cam ring has two oblique camways 92 into which project studs 93 on the gasket holder. In order to make the assemblage of the parts possible the camways 92 are connected with the outer edges of the ring by short branch channels 94 through which the studs 93 may reach the camways. In order to prevent the disengagement of the parts when assembled the cam ring 85 which projects for a short distance behind the web 91 is formed with a lug 95 and the web 91 with a perforation 96 adapted to receive the spring lugs 97 of a stud 98 which acts as a stop for lug 95. Fig. 15 shows the parts in the position which they assume when the studs 93 on the gasket holder enter the connecting channels 94 of the camway. The stud 98 has not been put in place in the web 91. Fig. 16 shows the cam ring rotated far enough to move the studs 93 from the connecting channels 94 and the stop stud 98 in place to prevent backward rotation of the cam lug to its initial position. It will be obvious that instead of having the camways in the cam ring and the studs 93 on the gasket holder the positions of these elements might be reversed.

Fig. 18 shows a coupling element of the same general type as that shown in Figs. 1 to 8 inclusive but adapted for a gasket, of a type commonly used, which is conical in shape and has a transverse groove for a lock pin. In this modification the gasket holder 99 has a flaring mouth 100 for the gasket 101, the latter being shown as formed with a transverse groove 102. The gasket holder has a pivoted locking device 103 formed with a rib 104 which enters the groove 102 in the gasket. The inner extremity 105 of the locking device enters a slot 106 in the forward edge of the coupler head 107. The other parts of the device are the same as shown in the first seven figures of the drawings and are correspondingly numbered.

In Fig. 19, 108 is the coupler head, 109 the gasket holder, and 110 the gasket which is formed with a rib 111 lying in a groove 112 in the projecting part 113 of the forward end of the gasket holder, the gasket being kept in place by lug 114 on the head. 115 is the actuating member having a threaded engagement 116 with the gasket holder and provided with angular studs 118 which project into a groove 119 formed on the head.

The couplers embodying the constructions previously described are capable of mating with any of the straight-port gravity or "Sewall" type couplers now in use on railroads. If the longitudinal movement of the gasket holder is great enough, the coupling operation may be accomplished without rocking the coupler heads. If necessary, they may be rocked in the ordinary way.

In Figs. 20 and 21 I have shown a simplified form of the invention in which the coupler elements are not of such character as to be engageable with standard couplers of the gravity type. The coupler head 120 is provided with a resilient loop 121 which is adapted to fit over a headed stud 122$^a$ on the mating coupler head. The fact that the gaskets are not in contact when the heads are brought together, the gaskets 123, 123$^a$ being supported in movable gasket holders as in the construction hereinabove described, permits the loops to extend over the heads of stud 122$^a$. The engagement of the loops with the heads of the studs centers the gaskets and prevents lateral displacement of the coupling member before and during the time the gaskets are brought into operative contact with each other. These two figures show a rounded form of gasket fitting into a correspondingly formed groove 124 in the gasket holder 125.

In Figs. 22 and 23 the coupler head 126 is provided with an arm 127 which is adapted to bear against the mating coupler head 126$^a$. The latter is provided with a headed stud 128$^a$ and the arm 127 formed with an elongated perforation 129. In this coupling the gasket 130 is formed with a groove 131 on its perimeter and the gasket holder 132 with a rib 133 which fits into this groove.

In Fig. 24 the coupler head 134 is formed with an arm 135 provided on its inner face with a lug 136 which is undercut at 137 to receive a stud on the mating coupler head corresponding with the stud 138 on the coupler member shown. The gasket 139 is formed with a peripheral groove the width of the gasket which fits a correspondingly formed portion 140 on the gasket holder 141.

In Fig. 25 the head 142 is provided with a triangular undercut lug 143 and with an arm 144 having a triangular opening 145 through which projects the lug on the mating coupler member corresponding to lug 143. The shape of the lug and the opening through which it passes insures perfect alinement beetweeen the mating elements of the coupling.

In Figs. 26 to 28 inclusive, the actuating element for moving the gasket holder consists of a transversely slidable cam or wedge member instead of the revoluble cam member of the preceding figures. The coupler head 146 is formed with oppositely arranged slots 147 through which projects a yoke-like member 148 which surrounds the gasket holder 149 and is provided with wedge or cam faces 150 engaging diametrically arranged studs 151 on the gasket holder. The webs 152 at the inner end of the head 146 are formed with diametrically arranged projections 153 standing at ninety degrees from studs 151. A ring 154 is interposed between the actuating member 148 and the projections 153. The actuating or wedge member 148 may be driven back and forth to move the gasket to and from its engagement with the gasket of the mating coupler member. The particular construction shown provides a spring 155 for retracting the gasket holder. In these figures we have shown a gasket 156 provided with a metal ferrule 157 formed with bendable tongues 158 which, when bent, engage with a rib 159 in the mouth of the gasket holder.

It will be obvious that the various forms of gasket and the various devices employed for holding the gasket in place in the gasket holder might be used interchangeably in the different forms of coupler herein disclosed.

While we have described our invention in certain preferred embodiments, it will be understood that further modifications might be made without departure from the principles of the invention. Therefore we do not wish to be understood as limiting the invention to the particular constructions, arrangements and devices shown and described except so far as the claims are expressly so limited.

The form of invention shown in Fig. 19 is not claimed specifically in this application, the specific features of this form of the invention being claimed in our co-pending application, Serial No. 288,903, filed April 10, 1919.

We claim:

1. A railway train pipe hose coupler comprising a conduit member, a coupling member movable with respect to the conduit member and provided with means which may be preliminarily engaged with another coupler in an interlocked engagement by moving said couplers together laterally, which engagement centers and maintains in centered relation the ports of said couplers, and means for effecting a relative movement between said coupling and conduit members whereby the latter is brought into effective contact with said other coupler.

2. A railway train pipe hose coupler comprising a conduit member, a coupling member movable with respect to the conduit member and provided with means whereby it may be preliminarily engaged with another coupler in an inter-locked engagement by moving said couplers together laterally, which engagement holds said coupling member and other coupler in substantially their normal coupled alinement, with the port of the latter and that of the conduit member centered, and means for effecting a relative movement between said coupling and conduit members whereby the conduit member is brought into effective contact with said other coupler.

3. A railway train pipe hose coupler comprising a conduit member, a coupling member movable with respect to the conduit member and provided with means whereby it may be preliminarily engaged with another coupler by moving the couplers together laterally into an interlocked engagement in which the ports of said couplers are centered and maintained in centered relation by gravity, and means for effecting a relative movement between said coupling and conduit members whereby the latter is brought into effective contact with said other coupler.

4. A railway train pipe hose coupler comprising a conduit member, a coupling member movable with respect to the conduit member and provided with means whereby it may be preliminarily engaged with another coupler by moving the couplers together laterally into an interlocked engagement in which said coupling member and said other coupler are held by gravity in substantially their normal coupled alinement as against displacement in any direction, and means for effecting a relative movement between said coupler and conduit members whereby the latter is brought into effective contact with said other coupler.

5. A railway train pipe hose coupler comprising a conduit member provided with a gasket at its outer end, a coupling member movable with respect to said conduit member and provided with means whereby it may be preliminarily engaged with another coupler by moving the couplers together laterally into an interlocked engagement which centers and maintains in centered relation said gasket and the port of said other coupler, and means for effecting a relative movement between said coupling and conduit members whereby said gasket is brought into effective contact with said other coupler.

6. A railway train pipe hose coupler comprising a conduit member, a coupling member movable longitudinally with respect to the conduit member and provided with means which may be preliminarily engaged with another coupler by moving the couplers together laterally into an interlocked engagement which centers and maintains in centered relation the ports of said coupler, and means for effecting a relative movement between said coupling and conduit members whereby the latter is brought into effective contact with said other coupler.

7. A railway train pipe hose coupler comprising a conduit member provided with a gasket at its outer end, a coupling member movable with respect to the conduit member and provided with means whereby it may be preliminarily engaged with another coupler by moving the couplers together laterally into an interlocked engagement in which said coupling member and other coupler are held by gravity in substantially their normal coupled alinement as against displacement in any direction, and means for effecting a relative movement between said coupling and conduit members whereby said gasket is brought into effective contact with said other coupler.

8. A railway train pipe hose coupler comprising a conduit member, a coupling member movable with respect to the conduit member and provided with means which may be preliminarily engaged with another coupler in an interlocked engagement by moving the couplers together laterally, which engagement centers and maintains in centered relation the ports of said couplers, and manually operated means for effecting a relative movement between said coupling and conduit members whereby the latter is brought into effective contact with said other coupler.

9. A railway train pipe hose coupler comprising a conduit member, a coupling member surrounding and movable longitudinally on the conduit member and provided with means whereby it may be preliminarily engaged with another coupler in an interlocked engagement which centers and maintains in centered relation the ports of said couplers, and a cam member surrounding said conduit member, by operation of which the latter is forced into effective contact with said other coupler.

10. A railway train pipe hose coupler comprising a conduit member and a coupling member, the latter being provided with means whereby it may be preliminarily engaged with another coupler in an interlocked engagement which centers and maintains in centered relation the ports of said couplers; said conduit and coupling members being movable with respect to each other to permit said engagement by moving said couplers laterally toward each other without appreciable angular movement thereof; and means for effecting a relative movement between said coupling and conduit members whereby the latter is brought into effective contact with said coupler.

11. A railway train pipe hose coupler comprising a conduit member and a coupling member, the latter being provided with means whereby it may be preliminarily engaged with another coupler in an interlocked engagement which holds said coupling member and other coupler in substantially their normal coupled alinement, with the port of the latter and that of the conduit member centered; said coupling and conduit members being movable with respect to each other to permit said engagement by moving the couplers laterally toward each other without appreciable angular movement thereof, and means for effecting a relative movement between said coupling and conduit members whereby the latter is brought into effective contact with said other coupler.

12. A railway train pipe hose coupler comprising a conduit member, a coupling member movable with respect to the conduit member, means, comprising gravity cams adapted to be interlocked with another coupler by bringing the couplers together laterally, for holding said coupling member and other coupler in a preliminary engagement with the conduit member out of operative contact with the other coupler, and manually operable means for effecting a relative movement between said coupling and conduit members whereby the latter is brought into effective contact with said other coupler and said cam engagement tightened.

13. A railway train pipe hose coupler comprising a conduit member, a coupling member movable with respect to the conduit member and provided with gravity cams adapted to interlock with another coupler, means for maintaining said coupling and other coupler in alinement as against a rocking movement on said cams, and hand operated means for effecting a relative movement between said coupling and conduit members whereby the latter is brought into effective contact with said other coupler.

14. A railway train pipe hose coupler comprising a conduit member and coupling member provided with gravity cams adapted to have an interlocking engagement with another coupler; said coupling and conduit members being movable with respect to each other to permit said engagement by moving the couplers laterally one toward the other without appreciable angular movement; and means for effecting a relative movement between said members whereby the conduit member is brought into effective contact with said other coupler.

15. A railway train pipe hose coupler comprising a conduit member and coupling member provided with gravity cams adapted to have an interlocking engagement with another coupler; said coupling and conduit members being movable with respect to each other to permit said engagement by moving the couplers laterally one toward the other without appreciable angular movement; and means for holding said coupling member and other coupler in substantial alinement as against rocking movement on said cams.

16. In a railway train pipe hose coupling, the combination of a conduit member provided with a gasket at its outer end, a coupling member surrounding said conduit member and provided with means comprising gravity cams arranged on opposite sides of said member whereby it may be engaged with a mating coupler in an interlocked relation which holds said coupling member in substantially normal alinement with said other coupler, said gasket being centered with respect to the port of said other coupler; said coupling member being slidably arranged on the conduit member so as to allow said engagement to be made without substantial angular movement of the couplers, and means for effecting a relative movement between said coupling and conduit members whereby said gasket is brought into effective contact with said other coupler.

17. In a railway train pipe hose coupler, the combination of a conduit member provided with a gasket at its outer end, a coupling member surrounding said conduit member and provided with means comprising gravity cams arranged on opposite sides of said member whereby it may be engaged with a mating coupler in an interlocked relation which holds said gasket substantially parallel to the meeting face of said mating coupler and centered with respect to the port thereof; said coupling member being slidably arranged on the conduit member to allow said engagement to be made without substantial angular movement of said couplers, and means for effecting a relative movement between said coupling and conduit members whereby the gasket is brought into effective contact with said other coupler.

18. In a railway train pipe hose coupler, the combination of a conduit member provided with a gasket, a coupling member surrounding said conduit member and provided with gravity cams on opposite sides thereof to engage with the corresponding parts of another coupler to hold said coupling member and coupler from lateral displacement, and with means engaging said other coupler to prevent appreciable angular movement of said coupling member and coupler; said coupling member being slidably arranged on said conduit member to allow said engagement to be made without substantial angular movement of the couplers, and means for effecting a relative movement between said coupling and conduit members whereby said gasket is brought into effective contact with said other coupler.

19. In a railway train pipe hose coupler, the combination of a conduit member provided with a gasket, a coupling member surrounding said conduit member and provided with means on opposite sides thereof to engage with corresponding parts of another coupler to hold said coupling member and coupler from lateral displacement, and with means engaging said other coupler to prevent angular movement of said coupling member and coupler; said coupling member being slidably arranged on said conduit member to allow said engagement to be made without substantial angular movement of the couplers, and means for effecting a relative movement between said coupling and conduit members whereby said gasket is brought into effective contact with said other coupler.

20. A railway train pipe hose coupler comprising a conduit member provided with a gasket, a coupling member surrounding said conduit member, provided on one side with a forwardly projecting arm adapted to engage a mating coupler, and on the other side with an undercut projection adapted to be engaged by the arm of said mating coupler, whereby said coupling member and coupler may be held by gravity with said gasket centered with respect to the port of said mating coupler; said coupling member being slidably arranged on the conduit member to allow said engagement to be made without substantial angular movement of the couplers; and means for effecting a relative movement between said coupling and conduit members whereby said gasket is brought into effective contact with said other coupling member.

21. A railway train pipe hose coupler comprising a conduit member provided with a gasket, a coupling member surrounding said conduit member provided on one side with a forward projecting arm adapted to engage a mating coupler and on the other side with an undercut projection adapted to be engaged by the arm of said mating coupler whereby said coupling member and coupler may be held by gravity against lateral displacement, means for holding said coupling member and coupler from angular movement; said coupling member being slidably arranged on said conduit member to allow said engagement to be made without substantial angular movement of the couplers; and means for effecting a relative movement between said coupling and conduit members whereby said gasket may be brought into effective contact with said other coupler.

22. A hose coupler comprising a conduit member, a coupling member movable with respect to the conduit member and provided with means whereby it may be preliminarily engaged with a mating coupler of the Sewall type by bringing said couplers together laterally and held in substantial alinement with said mating coupler, and means for effecting a relative movement between said members whereby the conduit member is brought into effective contact with said other coupler.

23. A hose coupler comprising a conduit member, a coupling member movable with respect to the conduit member and provided with means whereby it may be preliminarily engaged with a mating coupler of the Sewall type by bringing said couplers together laterally and held by gravity in substantial alinement with said mating coupler, and means for effecting a relative movement between said members whereby the conduit member is brought into effective contact with said other coupler.

24. A hose coupler comprising a conduit member, a coupling member movable longitudinally with respect to the conduit member and provided with means whereby it may be preliminarily engaged and held in substantial alinement with a mating coupler of the Sewall type, and a hand operated wedging device for effecting a relative movement between said members whereby the conduit member is brought into effective contact with said other coupler.

25. A hose coupler comprising a conduit member, a coupling member movable with respect to said conduit member and provided with means whereby it may be brought into engagement with a mating coupler of the Sewall type by moving said couplers one toward the other without appreciable angular movement thereof, and means for effecting a relative movement between said coupling and conduit members whereby the latter is brought into intimate contact with said other coupler.

26. A hose coupler comprising a conduit member, a coupling member movable with respect to said conduit member and provided with means whereby it may be brought into engagement with a mating coupler of the Sewall type by moving said couplers one toward the other without appreciable angular movement thereof, means for preliminarily holding said couplers in substantial alinement with said others, and means for effecting a relative movement between said coupling and conduit members whereby the latter is brought into intimate contact with said other coupler.

27. A hose coupler comprising a conduit member, a coupling member movable with respect to said conduit member and provided with means whereby it may be brought into engagement with a mating coupler of the Sewall type by moving said couplers one toward the other without appreciable angular movement thereof, means for preliminarily holding said couplers by gravity in substantial alinement with each other, and means for effecting a relative movement between said coupling and conduit members whereby the latter is brought into intimate contact with said other coupler.

28. A hose coupler comprising a conduit member, a coupling member longitudinally movable with respect to said conduit member and provided with means whereby it may be brought into engagement with a mating coupler of the Sewall type by moving said couplers one toward the other without appreciable angular movement thereof, means for preliminarily holding said couplers by gravity in substantial alinement with each other, and means for effecting a relative movement between said coupling and conduit members whereby the latter is brought into intimate contact with said other coupler.

29. In a hose coupling, the combination of a coupling member adapted to engage with a mating coupler, a gasket holding conduit member movably supported by said coupling member which in its normal position is adapted to hold a gasket against removal and in another position permits the removal of said gasket, and means for moving said conduit member so as to bring the gasket held thereby into contact with the gasket of the other coupler.

30. In a hose coupling, the combination of a coupling member adapted to engage with a mating coupler, a gasket holding conduit member movably supported by said coupling member having a gasket receiving recess open at one side to permit the gasket to be put in place and removed, means for moving the conduit member so as to bring said gasket into contact with the gasket of the other coupler, and means which in the normal position of said conduit member prevents the removal therefrom of the gasket.

31. In a hose coupling, the combination of a coupling member adapted to engage with a mating coupler, a gasket holding conduit member movably supported by said coupling member having a gasket receiving recess open at one side to permit the gasket to be put in place and removed, means for moving the conduit member so as to bring said gasket into contact with the gasket of the other coupler, and a lug on the coupling member which in the normal position of said conduit member prevents the removal therefrom of the gasket.

32. In a hose coupling, the combination of a coupling member adapted to engage with a mating coupler, a gasket holding conduit member movably supported by said coupling member having a gasket receiving recess open at one side to permit the gasket to be put in place and removed, and means which in the normal position of said conduit member prevents the removal of the gasket therefrom.

33. In a hose coupling, the combination of a coupling member adapted to engage with a mating coupler, a gasket holding conduit member movably supported by said coupling member provided with an arcuate gasket receiving flange which is formed with a groove angular in cross section, a gasket, the perimeter of which fits said groove, and a lug which in the normal position of the conduit member overlaps the gasket to prevent the removal of the same from said member.

34. In a hose coupling, the combination of a coupling member adapted to engage with a mating coupler, a gasket holding conduit member movably supported by said coupling member provided with an arcuate gasket receiving flange which is formed with a groove angular in cross section, a gasket, the perimeter of which fits said groove, and a lug on the coupling member which in the normal position of the conduit member overlaps the gasket to prevent the removal of the same from said member.

35. In a coupling, a hollow coupling member having an elliptically shaped counterbore and formed on the side near its inner end with a slot, a gasket holding conduit member slidably arranged in said coupling member and provided at its outer end with an arcuate gasket holding flange and near its inner end with a pair of diametrically arranged studs, an elliptically shaped helical spring arranged in said elliptical counterbore and bearing against said studs on the conduit member, an annular cam arranged within the inner end of said coupling member having cam faces adapted to bear against said studs, a handle which projects through said arcuate slot, a gasket, and a lug on said coupling member which overlaps said gasket.

36. In a coupling, a coupling member provided with means for engaging a mating coupler, a gasket holding conduit member which projects through said coupling member and is provided with an enlargement having means for holding a gasket, a gasket held therein, a pair of lugs on the conduit member, a helical spring which is interposed between said lugs and the coupling member, and an annular cam which surrounds the conduit member and is interposed between the enlargement thereof and the coupling member.

37. In a hose coupling, the combination with a coupling member adapted to engage a mating coupler, a gasket holding conduit member movable with respect to the coupling member in the direction of the axis of the gasket, and a member for moving said conduit member provided with cam surfaces, said coupling and conduit members each formed so as to provide a pair of diametrically opposite bearing points for said member, one pair being ninety degrees from the other and one pair of which is engaged by said cam surfaces.

38. In a hose coupling, the combination with a coupling member adapted to engage a mating coupler, a gasket holding conduit member movable with respect to the coupling member in the direction of the axis of the gasket, and a member for moving said conduit member provided with cam surfaces, said coupling and conduit members each formed so as to provide a plurality of bearing points for said member, those on one being arranged midway between those on the other, and one set being engaged by said cam surfaces.

39. In a hose coupling, the combination of a coupling member adapted to be engaged with a mating coupler, a conduit member and a movable actuating member for shifting said conduit member; said actuating member adapted to bear upon the coupling member at a plurality of points and upon the conduit member at points intermediate the bearing points on the other member and one of said members being formed with cam surfaces disposed so that the movement of the actuating member imparts longitudinal movement to the conduit member.

40. In a hose coupling, the combination of a coupling member adapted to be engaged with a mating coupler, a conduit member, and a movable actuating member for shifting said conduit member; said actuating member adapted to bear upon the coupling member at diametrically opposite points and upon the conduit member at diametrically opposite points at right angles to said first named bearing points, and one of said members being formed with cam surfaces disposed so that the movement of the actuating member imparts longitudinal movement to said conduit member.

41. In a hose coupling, the combination of a coupling member adapted to be engaged with a mating coupler, a conduit member, and a revoluble actuating member for shifting said conduit member; said actuating member adapted to bear upon the coupling member at diametrically opposite points and upon the conduit member at diametrically opposite points at right angles to said first named bearing points, and one of said members being formed with cam surfaces disposed so that the movement of the actuating member imparts a longitudinal movement to said conduit member.

42. In a hose coupling, the combination of a coupling member adapted to engage with a mating coupler and a gasket holding conduit member movably supported by said coupler member which, in its normal position, is adapted to hold the gasket against removal and in another position permits the removal of said gasket.

43. A railway train pipe hose coupling, comprising mating coupler heads, each having a longitudinal bore and a recess or pocket extending transversely thereof and having an opening at one side laterally of the head, a sleeve member slidably mounted therein and provided at its forward end with a seat for a gasket, and adjusting means located in said recess and operatively connected to said sleeve to move it forward and backward in said bore, a portion of said means projecting laterally through said opening so that it may be manually operated.

44. A railway train pipe hose coupling, comprising mating coupler heads, each having a longitudinal bore and a recess or pocket extending transversely thereof and having a portion forming a housing thereover, a sleeve member slidably mounted therein and provided at its forward end with a seat carrying a gasket, and adjusting means located in said recess and operatively connected to said sleeve comprising an element adapted to engage the front or rear wall of said recess so that when said element is rotated said means will move said sleeve member forward and backward in said bore.

45. A hose coupler comprising a coupling member, a conduit member extending loosely through said coupling member, and an actuating member engaging the coupling and conduit members for effecting a relative movement between said members; the points of engagement between the actuating member and the conduit member providing rocking bearings which permit angular adjustment of the conduit member in the coupling member.

46. A hose coupler comprising a coupling member, a conduit member extending through said coupling, and actuating means for effecting relative movement between the coupling and conduit members; the connection between said actuating means and said members permitting automatic angular adjustment of said members.

47. A hose coupler comprising a coupling member and a conduit member movable longitudinally of the coupling member, the coupling member being provided with means whereby it may be engaged with a mating coupler and held in substantially normal coupled relation therewith, when the conduit member is retracted, and means for forcing the conduit member against the corresponding part of the mating coupler.

48. A hose coupler comprising co-engaging coupling members adapted to be interlocked one with the other by moving said coupling members together laterally, said coupling members being formed with locking elements which interlock with lugs formed on the sides of the co-engaging coupler members, a movable conduit member carried by one of said coupling members, and an actuating cam for causing relative movement between said coupler and conduit members.

49. A railway train-pipe hose coupler comprising a coupling member having an undercut cam lug adapted to interlock with the locking arm of a mating coupler and provided with a locking arm having an undercut cam groove which interlocks with the cam lug of said mating coupler; said cam groove being closed at one end to provide an abutment of the cam lug of said mating coupler.

50. A railway train-pipe hose coupler comprising a coupling member having an undercut cam lug adapted to interlock with the locking arm of a mating coupler and provided with a locking arm having an undercut cam groove which interlocks with the cam lug of said mating coupler; said cam groove being closed at one end to provide an abutment of the cam lug of said mating coupler, and means projecting from the locking arm of said coupling member adapted to engage the cam lug of the mating coupler whereby a rocking movement of the couplers is prevented.

51. A railway train-pipe coupler comprising a coupling member adapted to interlock with a mating coupler, a conduit member movable with respect to the coupling member, adjusting means for moving the conduit member into operative contact with the mating coupler, and a resilient device adapted to hold said adjusting device in its adjusted position.

52. A railway train-pipe coupler comprising a coupling member adapted to interlock with a mating coupler, a conduit member movable with respect to the coupling member, a cam for moving the conduit member into operative contact with the mating coupler, and a resilient device adapted to hold said cam in its adjusted position.

53. A railway train-pipe coupler comprising a coupling member adapted to interlock with a mating coupler, a conduit member movable with respect to the coupling member, a cam engaged with said conduit member and adapted to move the same longitudinally of the coupling member into operative engagement with the mating coupler, and a resilient device adapted to hold said conduit member in engagement with the cam whereby the cam is held in its adjusted position.

54. A railway train-pipe coupler comprising a coupling member adapted to interlock with a mating coupler, a conduit member movable with respect to the coupling member, a cam engaged with said conduit member and adapted to move the same longitudinally of the coupling member into operative engagement with the mating coupler, and a spring device adapted to exert a spring pressure against the conduit member to hold said member in engagement with the cam whereby the cam is held in its adjusted position.

55. A railway train pipe hose coupler comprising a member adapted to have an interlocking engagement with another coupler, whereby said couplers are supported one upon the other, and a longitudinally movable member adapted to be forced against the other coupler and to be withdrawn therefrom to provide an orifice for outflow of fluid without disengagement of the first mentioned member from said mating coupler.

56. A hose coupler comprising in combination a coupling member adapted to engage the mating coupler, a conduit member movable in said coupling member, wedging means between said members, and a resilient element arranged to be stressed to cushion said parts and prevent a loosening of the wedging means.

57. A hose coupler comprising in combination a coupling member adapted to engage a mating coupler, a conduit member movable in said coupling member, a cam ring between said members, and a resilient element arranged to be stressed to cushion said parts and prevent a loosening movement of the cam ring.

58. A hose coupler comprising in combination a coupling member adapted to engage a mating coupler, a conduit member movable in said coupling member, a member for forcing said conduit member against said other coupler, and a resilient element arranged between two of said members adapted to be compressed when the parts of the coupler are operatively connected with the mating coupler.

59. A hose coupler comprising in combination a coupling member adapted to engage a mating coupler, a conduit member movable in said coupling member, a member for forcing said conduit member against said other coupler, and an annular resilient element arranged between two of said members adapted to be compressed when the parts of the coupler are operatively connected with the mating coupler.

EDWARD A. RUSSELL.
SEELYE P. HARRIMAN.